(12) United States Patent
McCafferty et al.

(10) Patent No.: US 9,823,374 B2
(45) Date of Patent: Nov. 21, 2017

(54) METHODS AND APPARATUS FOR WELLBORE EVALUATION

(71) Applicant: Halliburton Energy Services, Inc., Houston, TX (US)

(72) Inventors: Shawn Patrick McCafferty, Midlothian, TX (US); Adewumi Ehinmoro, Houston, TX (US); Ivo Foianini, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 136 days.

(21) Appl. No.: 14/772,028

(22) PCT Filed: Apr. 9, 2014

(86) PCT No.: PCT/US2014/033469
§ 371 (c)(1),
(2) Date: Sep. 1, 2015

(87) PCT Pub. No.: WO2014/169022
PCT Pub. Date: Oct. 16, 2014

(65) Prior Publication Data
US 2016/0018548 A1    Jan. 21, 2016

Related U.S. Application Data

(60) Provisional application No. 61/810,161, filed on Apr. 9, 2013.

(51) Int. Cl.
*G01V 1/40* (2006.01)
*E21B 47/00* (2012.01)
(Continued)

(52) U.S. Cl.
CPC ............ *G01V 1/40* (2013.01); *E21B 47/0002* (2013.01); *E21B 47/102* (2013.01);
(Continued)

(58) Field of Classification Search
CPC . G01V 1/40; G01V 3/28; G01V 11/00; E21B 47/14; E21B 47/102; E21B 47/0002; E21B 47/1005
(Continued)

(56) References Cited

U.S. PATENT DOCUMENTS 2,648,056 A * 8/1953 Jakosky ............... E21B 47/082
367/27
4,607,698 A 8/1986 Wood
(Continued)

FOREIGN PATENT DOCUMENTS

WO    WO-2014169022 A1    10/2014

OTHER PUBLICATIONS

"Canadian Application Serial No. 2,901,573, Office Action dated Sep. 2, 2016", 4 pgs.
(Continued)

*Primary Examiner* — Daniel L Murphy
(74) *Attorney, Agent, or Firm* — Gilliam IP PLLC

(57) ABSTRACT

A wellbore tool string includes a combination of acoustic inspection tool(s) and electro-mechanical inspection tool(s). The tool string is configured to combine acoustic with electro-mechanic wellbore inspection to circumvent limitations that both technologies may be subject to in wellbore environments. Anomalous data from one or more acoustic tools can be correlated with data acquired by an electro-mechanical tool incorporated into the same tool string to determine wellbore conditions that may have adversely affected the operation of the acoustic tool(s).

26 Claims, 4 Drawing Sheets

(51) Int. Cl.
  *G01V 3/28* (2006.01)
  *G01V 11/00* (2006.01)
  *E21B 47/10* (2012.01)
  *E21B 47/14* (2006.01)
(52) U.S. Cl.
  CPC .......... *E21B 47/1005* (2013.01); *E21B 47/14* (2013.01); *G01V 3/28* (2013.01); *G01V 11/00* (2013.01)
(58) Field of Classification Search
  USPC ...................................... 367/7, 35, 25; 702/6
  See application file for complete search history.

(56) References Cited

U.S. PATENT DOCUMENTS

| | | | | |
|---|---|---|---|---|
| 4,964,101 | A | * | 10/1990 | Liu .......................... G01V 1/50 367/31 |
| 5,318,123 | A | | 6/1994 | Venditto et al. |
| 2004/0256101 | A1 | | 12/2004 | Fox et al. |
| 2011/0010097 | A1 | | 1/2011 | Franquet |
| 2011/0240302 | A1 | | 10/2011 | Coludrovich, III |

OTHER PUBLICATIONS

"International Application Serial No. PCT/US2014/033469, International Search Report dated Aug. 14, 2014", 3 pgs.
"International Application Serial No. PCT/US2014/033469, Written Opinion dated Aug. 14, 2014", 9 pgs.
"Application Serial No. PCT/US2014/033469, International Preliminary Report on Patentability dated Oct. 22, 2015", 11 pgs.

* cited by examiner

METHODS AND APPARATUS FOR WELLBORE EVALUATION

PRIORITY APPLICATION

This application is a U.S. National Stage Filing under 35 U.S.C. 371 from International Application No. PCT/US2014/033469, filed on 9 Apr. 2014, and published as WO 2014/169022 A1 on 16 Oct. 2014, which application claims the benefit of priority to U.S. Provisional Application Ser. No. 61/810,161, filed Apr. 9, 2013, which applications and publication are incorporated herein by reference in their entirety.

BACKGROUND

Acoustic tools used to inspect and evaluate wellbore conditions can be limited in providing accurate data acquisition when wellbore conditions are non-ideal, e.g., when the pipe casing within the wellbore is irregular and/or damaged. The media of the wellbore, e.g., including pipe casing, cement, and formation, is important to the operation of acoustic evaluation tools, because it affects the manner in which acoustic waves are reflected/resonate within the wellbore. If, for example, the pipe wall is corroded, eroded, deformed, discontinuous, or in some way rugose, wave behavior can be substantially altered in such a way that the transducer of an acoustic tool is no longer able to receive the wave reflection/resonance within an expected timeframe and amplitude range. Such effects on wave reflection/resonance timing and amplitude can lead to anomalous data that is of limited utility in characterizing the section of the wellbore to which the data corresponds.

DETAILED DESCRIPTION

Figure 1:
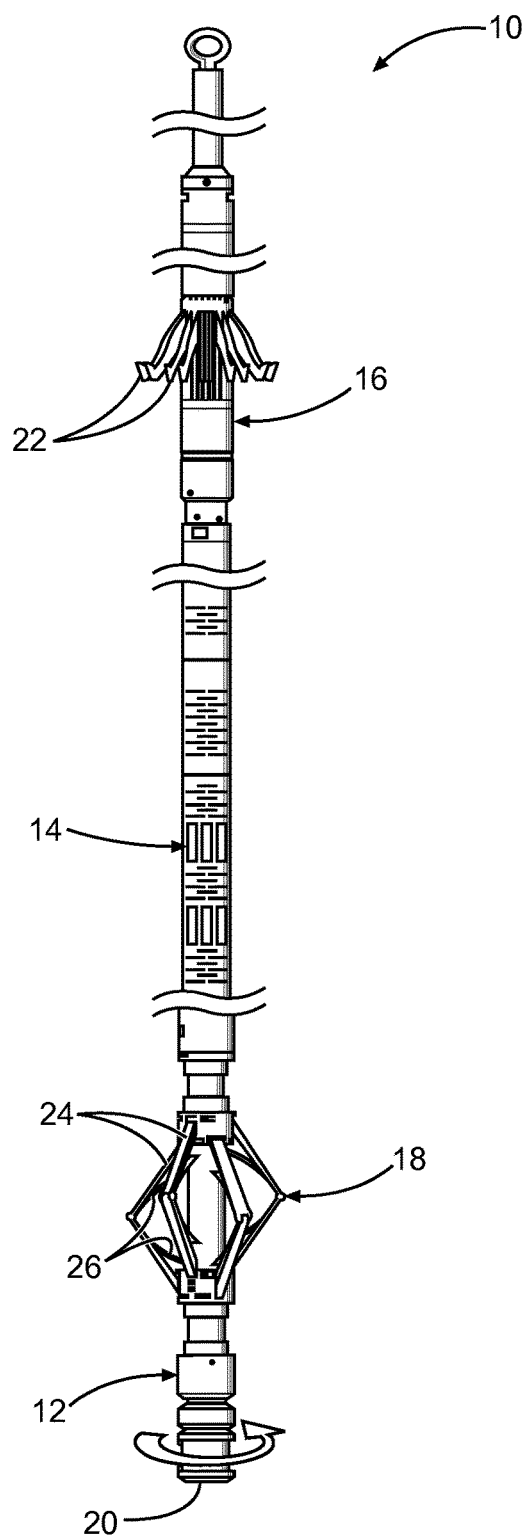
FIG. 1 is a conceptual diagram of an example wellbore logging tool string in accordance with this disclosure.

Examples according to this disclosure are directed to combining acoustic wellbore inspection tools with an electro-mechanic tool to circumvent limitations that both technologies may be subject to in wellbore environments, which, in turn, can provide less ambiguous results as to the condition of the wellbore completion and cement behind the wellbore pipe casing. Anomalous data from one or more acoustic tools can be correlated with data acquired by an electro-mechanical tool incorporated into the same tool string to determine wellbore conditions that may have adversely affected the operation of the acoustic tool(s).

A wellbore tool string including one or more acoustic inspection tools and an electro-mechanical tool can provide additional insight into current pipe and/or cement conditions within a wellbore. The running of a tool string providing multiple tools of mixed output can provide three or more levels of casing inspection and/or cement evaluation on a single run, and can result in additional well integrity information and tool operation efficiency. Additionally, using both acoustic based inspection data and electro-mechanical based data from a single run into the hole, correlative results can be obtained to indicate inadequate downhole conditions.

A wellbore tool string can include a first acoustic inspection tool configured to generate data indicative of downhole conditions, a second acoustic inspection tool like an ultrasonic imaging tool configured to image downhole structures, and an electro-mechanical inspection tool configured to generate data indicative of wellbore conditions based on electro-mechanical signals generated by the electro-mechanical inspection tool within the wellbore. For example, a wellbore tool string can include a cement bond log tool (CBL) configured to generate data indicative of downhole conditions, a circumferential acoustic scanning tool (CAST) configured to image downhole structures, and a multi-finger caliper (MFC) configured to generate data indicative of wellbore conditions based on electro-mechanical signals generated by the electro-mechanical inspection tool within the wellbore.

The CBL, CAST, and MFC are coupled to one another and configured to provide both acoustic and electro-mechanical inspection of the wellbore. Anomalous data from one or both of the CAST and the CBL can be correlated with data acquired by the MFC incorporated into the same tool string to determine wellbore conditions that adversely affect the operation of one or both of the acoustic tool(s).

A CAST/CBL/MFC tool string in accordance with this disclosure can be configured to acquire wellbore condition information through different mechanisms, the outputs of which may be correlated to one another to increase inspection accuracy and efficiency. A CAST is a scanning tool that emits ultrasonic pulses towards the pipe wall, having a reflecting wave interval return to the transducer. The resonant wave intervals that are received by the CAST at later times (after vibrating through the pipe wall) provide additional wellbore information that can be processed. For example, first reflection and resonance wave intervals can be used to calculate pipe parameters, e.g., pipe thickness, pipe internal diameter (ID) and cement evaluation information, e.g., acoustic impedance of media outside of the pipe.

CBLs operate slightly different than ultrasonic scanning tools. CBLs use a transmitter that emits sonic frequency acoustic waves that are reflected back to two receivers, typically 3 feet and 5 feet away. The character of wave reflection is dependent on the presence of cement behind pipe, because the solid media can greatly influence signal properties. In some examples, CBLs provide 3-foot wave amplitude, 3-foot wave travel time, and 5-foot microseismogram (MSG), which is a visual representation showing the wave interactions with pipe, cement, mud, and formation.

MFCs are able to determine pipe radii measurements on a vertical scale, based on the radial translation of individual "fingers" of the MFC as they scrape the pipe inner wall. Electro-mechanical calipers can acquire higher-resolution data, based on faster rates of data recovery and electronic conversion of mechanical measurements. The caliper "fingers" are attached to actuators, such as, e.g., wires that connect caliper fingers and a sensor head. Each MFC finger can be connected to an actuator, which fits into the sensor head. When "fingers" pivot in and out based on pipe radii changes, the actuator moves in and out accordingly. Changes in actuator position within the sensor head causes changes in electrical induction, which in turn generates a voltage pulse.

Changes in the voltage pulses can then be translated into changes in pipe ID at different longitudinal positions along the wellbore.

Ultrasonic and sonic scanning tools such as, e.g., CASTs and CBLs may have wellbore limitations that restrict their proper operational to particular conditions, due to their acoustic nature of operation. Acoustic waves, independent of output frequency, can be heavily influenced by media properties. The media that waves typically travel through, e.g., mud, pipe, cement, and formation, can vary wave amplitude and travel times, translating into changes in cement and pipe characterization by acoustic inspection tools.

As such, examples according to this disclosure are configured to correlate anomalous data from one or more acoustic tools of the tool string with data acquired by an electro-mechanical tool incorporated into the same tool string to determine wellbore conditions that adversely affected the operation of the acoustic tool(s). For example, an ultrasonic scanning tool like a CAST is able to acquire distinct pipe inspection data sets. The transducer such tools include can operate both as a wave transmitter and receiver. In order to differentiate wave emittance and reception during a single scanner head revolution, a CAST can be configured to generate time "bins" within which to reacquire first reflection and/or resonance wave intervals and process them to produce pipe inspection results for each radial sample acquired by the tool.

If pipe conditions are compromised, however, acoustic waves may not properly reflect/resonate in the expected time bin due to, e.g., low wave amplitude or reduction/excess in wave travel time. In some examples, the CAST has a log quality control (LQC) curve that generates a bad shots index (BSI). BSI results that can be used to properly identify the issue by which each individual wave pulse was adversely affected, e.g., by associated different anomalous results from the CAST with different indices of the BSI.

BSI values associated with anomalous CAST measurements can be cross-referenced with individual radii measurements provided from an MFC tool. Evaluation of the electro-mechanical pipe measurement can be employed to determine, e.g., if there are any pipe anomalies within the logged interval corresponding to the BSI that have affected proper data acquisition with the CAST tool. For example, when an unexpectedly larger caliper radius is generated at the same depth interval as that of a CAST "bad shot", it can be inferred that the erroneous CAST results were due to a defect in the casing, such as a separation, a perforation, a reduction in thickness, e.g., caused by erosion or other damage to the wall of the casing.

FIG. 1 is a conceptual diagram of an example wellbore logging tool string 10 in accordance with this disclosure. Tool string 10 includes a circumferential acoustic scanning tool (CAST) 12, a cement bond log tool (CBL) 14, and a multi-finger caliper (MFC) 16. Tool string 10 also includes stabilizer 18, which is configured to center tool string 10 within a wellbore. CAST 12 and CBL 14 are acoustic tools that are configured to transmit and receive acoustic signals within a wellbore to evaluate different characteristics of the wellbore, including, e.g., pipe thickness and pipe internal diameter (ID) and characteristics of cement surrounding the wellbore pipe. MFC 16 is an electro-mechanical tool that is configured to measure the internal radius of a pipe at different longitudinal positions along the wellbore. Tool string 10 is configured to correlate anomalous data from one or more of the CAST 12 and CBL 14 acoustic tools with data acquired by the MFC 16 electro-mechanical tool to determine wellbore conditions that may have adversely affected the operation of the acoustic tool(s).

In operation, tool string 10 can be lowered into a wellbore, including, e.g., lowered down to a lowest target inspection depth, and then drawn back up, sometimes referred to as "logging up" the wellbore. As tool string 10 is moved up the wellbore, CAST 12, CBL 14, and MFC 16 are configured to acquire, record, process, and/or transmit wellbore data to inspect and evaluate various characteristics of the wellbore.

As noted above, CAST 12 is a scanning tool that emits ultrasonic pulses towards a wellbore wall, having a reflecting wave interval return to the tool. The resonant wave intervals that are received by CAST 12 at later times (after vibrating through the wellbore wall) provide wellbore information that can be processed. For example, first reflection and resonance wave intervals can be used to calculate pipe parameters, e.g., pipe thickness, pipe internal diameter (ID) and cement evaluation information, e.g., acoustic impedance of media outside of the pipe.

CAST 12 can include an electronics section and scanner assembly. The electronics section of CAST 12 can include circuit boards and other circuitry necessary for powering the electronics and the motor of the scanner assembly and for acquiring, computing, and sending data uphole for further processing. The electronics section of CAST 12 can include one or more circuits and/or components for energy storage, surge protection, power supply, memory, communication, data acquisition and processing, motor control, and transducer interface circuitry. Examples of memory circuitry that can be included in the electronics section of CAST 12 includes any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Additionally, examples of data acquisition and processing circuitry that can be employed in CAST 12 includes any one or more of a microprocessor, a controller, a digital signal processor (DSP), an application specific integrated circuit (ASIC), a field-programmable gate array (FPGA), or equivalent discrete or integrated logic circuitry.

A scanner assembly included in CAST 12 can include rotating head 20, which houses an ultrasonic transducer and is configured to be arranged at a fixed distance from the wellbore wall. Rotating transducer head 20 can be powered by a DC motor, which is configured to rotate head 20 at a rate in a range from approximately 2 revolutions per second (rps) to approximately 5 rps. The motor powering rotating transducer head 20 can also be configured to provide other rates of rotation. The transducer of CAST 12 can be configured to operate at different frequencies. The transducer in rotating head 20 of CAST 12 can be configured to provide in a range from 36 to 180 ultrasonic emissions, or, "shots" per 1 revolution of head 20. The transducer of CAST 12 can also be configured to operate at frequencies outside this range. As CAST 12 is drawn up the wellbore, the transducer can be configured to operate at different sampling rates per longitudinal distance, e.g., different numbers of samples per foot of distance traveled up the wellbore. CAST 12 can also be configured to operate at a maximum logging speed of approximately 75 feet per minute (ft/min).

CAST 12 can be employed in both cased and open wellbores. CAST 12 can also be configured to operate in multiple modes. For example, CAST 12 can be configured to operate in a pipe inspection mode (PIM) and a cement inspection mode (CIM), among other modes. In PIM, CAST 12 can acquire information about the pipe internal diameter (ID), external diameter (OD), pipe thickness (Ct), reflected wave amplitude (Amp), and the time of flight (TT). The number of shots per scan and the number of scans per foot can be programmed for PIM to achieve target data quality in a given condition. In some cases, PIM transmits less data relative to other modes, e.g., CIM, but the maximum logging speed may be still limited, e.g., to 75 ft/min. or less. Additionally, in some cases, better resolution can be achieved in PIM using a transducer sample rate of approximately 12 samples/ft.

In CIM, CAST 12 can be configured to provide information about the impedance and compressive strength of the materials behind a pipe casing in addition to the information provided in PIM. The amount of computation and data transmitted can be higher in CIM than in PIM and can also be limited to a maximum logging speed, e.g., 75 ft/min. or less.

In operation of CAST 12, the ultrasonic transducer, acting as both transmitter and receiver, located in rotating head 20 and positioned at a fixed distance from the wellbore wall, transmits an ultrasonic signal that strikes the wall of the wellbore (casing or borehole wall). The peak amplitude of the first arrival waveform (first reflection) at the transducer is determined (amplitude), and the two-way travel time (TA) for the ultrasonic signal to travel from the transducer to the wall and back is determined as well.

The peak amplitude measurement acquired by CAST 12 can be used to form an acoustic image of the wellbore wall, providing textural characteristics of the wall. The travel time information acquired by CAST 12 can be used to compute the diameter (acoustic caliper) and, hence, the shape of the wellbore. In a cased hole, the amplitude map can be used to find minute deformations, perforating holes and other anomalies in the casing wall.

Additionally, CAST 12 can use the characteristics of the resonance window (amplitude sum) to evaluate the cement impedance directly related to the bonding of the pipe to the casing and wellbore wall. The ultrasonic waveform vibrates the casing in its thickness mode and the thickness of the casing can be derived from the frequency analysis of the resonance window section of the reflected waveform.

As noted above, wellbore conditions are compromised, however, acoustic waves transmitted by the transducer in rotating head 20 of CAST 12 may not properly reflect/resonate in the expected amount of time, e.g., within the proper time "bin." As such, CAST 12 is equipped with an LQC curve that generates a bad shots index (BSI). CAST 12 and/or a surface operator and/or system can use BSI results to properly identify an issue by which each individual wave pulse was adversely affected, e.g., by associating different anomalous results from samples taken by CAST 12 with different indices of the BSI.

One cause of "bad shot" of CAST 12 includes, e.g., the resonance signal amplitude is very low, preventing a reliable thickness calculation. This could indicate that the pipe thickness is too thin or too thick for the scan transducer, among other causes. Another cause of a bad shot of CAST 12 is that waveforms are not properly acquired because the transducer is too close or too far from the casing wall. This condition can normally be visually identified looking at the waveforms displayed during logging. The travel time data, in such cases, may, for example, show values below 30 microseconds. Other possible bad shot causes include excessive noise in the baseline, the absence of a baseline, or a severe deformity of the transducer's signature. All these factors may prevent CAST 12 from determining the location of the first arrival. The BSI employed by CAST 12 can include five values associated with five different wellbore/signal conditions as follows:

0=the calculation of ID, Thickness, and Impedance is good;

1=rejection of travel time, e.g., reject data if TT outside 20-25 microseconds;

2=if the amplitude of the signal is outside a window the data is rejected;

3=if the casing thickness is outside a window the data is rejected; and

4=if the impedance value is outside a window the data is rejected.

Different values and associated conditions can also be employed in a BSI or other such index used by CAST 12.

CAST 12 can be a Monocable—Circumferential Acoustic Scanning Tool (CAST-M) manufactured by Halliburton Company of Houston, Tex. Tool string 10 including CAST 12 can operate via and be suspended within a wellbore by a single conductor cable, or, "monocable." In some examples, CAST 12 can be run using 7/32", 5/16", and 9/32" monocable and can also be run using the multi-conductor cable in a monocable mode. CAST 12 can also be a Fast—Circumferential Acoustic Scanning Tool (CAST-F) manufactured by Halliburton Company of Houston, Tex.

In a wellbore, a cement fill can be formed around a pipe casing to seal the well against fluids being passed along the pipe casing or becoming trapped in pockets next to the pipe casing. The integrity of the cement bond and the hydraulic seal provided thereby can increase the possibility that treatment fluids are positioned in targeted regions of the formation in those applications where stimulation techniques such as fracturing are employed. A well-sealed casing can also mitigate the possible contamination of hydrocarbons produced by the well and contamination of the formation through which the casing passes. A secondary effect of a satisfactory cement bond is to provide mechanical support for the pipe in the wellbore.

Referring to FIG. 1, tool string 10 also includes CBL 14. CBL 14 is configured to obtain data that can be used by tool string 10 and/or surface equipment to generate a log of the integrity of the bond between the wellbore pipe and the cement fill surrounding the pipe. Among other effects, cement that is well-bonded to the pipe can prevent the pipe from ringing, thereby damping the tendency of the pipe to ring and attenuating the acoustic energy flowing within the pipe. This attenuation enables the pipe-conducted sound to be reduced or largely eliminated from the data sensed by receivers of acoustic tools such as CAST 12 and CBL 14. Cement that is not well-bonded to the wellbore pipe can produce unwanted interference and also provide pockets of the borehole in the formation that can fill with other material such as water, oil, gas, and other fluid substances that may impair the accuracy of the logging operation.

CBL 14 can include a transmitter section, a first (near) receiver section, generally located three feet from the transmitter section, and a second (far) receiver section, generally located five feet from the transmitter section and in the same direction from the transmitter section as the near receiver section. The near receiver of CBL 14 can be used to provide data signals about the integrity of the cement bond to the well pipe, while the far receiver can be used to provide data signals about the formation surrounding the wellbore, which may include information about the cement bond with the formation. Each of the three sections include transducers for coupling sound energy into or from the vicinity of tool string 10. The relative positions of the three sections may be transmitter lowermost in the wellbore, followed by near receiver above the transmitter, and far receiver above the transmitter. In another example, the sections of CBL 14 may be inverted such that the far receiver is lowermost in the wellbore, followed by near receiver above the far receiver and the transmitter above the near receiver.

In some examples, an isolator section can be interposed between the transmitter section and the near receiver section of CBL 14. The isolator section can act to lengthen the acoustic path through the body of CBL 14 by an arrangement of alternating slots cut into the body of the tool, thus delaying the arrival of the sound energy traveling in the tool to minimize interference with the sound arriving at the receiver transducers via other paths of interest.

As with CAST 12, CBL 14 can also include one or more sections containing circuit boards and other circuitry necessary for powering electronics of CBL 14 and for acquiring, computing, and sending data uphole for further processing. The electronics section(s) of CAST 14 can include one or more of energy storage, surge protection, power supply, memory, communication, data acquisition and processing, and transmitter/receiver interface circuitry. Examples of memory circuitry that can be included in the electronics section of CAST 14 includes any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Additionally, examples of data acquisition and processing circuitry that can be employed in CAST 14 includes any one or more of a microprocessor, a controller, a digital signal processor (DSP), an application specific integrated circuit (ASIC), a field-programmable gate array (FPGA), or equivalent discrete or integrated logic circuitry.

As noted above, the transmitter of CBL 14 is configured to emit sonic frequency acoustic waves that are reflected back to the near and far receivers, which, as described above, are typically 3 feet and 5 feet away from the transmitter. The wave reflections are based on the presence of cement surrounding the wellbore pipe and the formation surrounding the cement, because the character of the media through which the sonic waves travel greatly influences signal properties. CBL 14 can be configured to provide 3-foot wave amplitude, 3-foot wave travel time, and 5-foot microseismogram (MSG). The MSG, as noted above, is a visual representation showing the wave interactions with pipe, cement, formation, and other materials in the wellbore, e.g., mud.

In addition to CAST 12 and CBL 14, tool string 10 also includes MFC 16. MFC 16 includes an array of caliper fingers 22 distributed circumferentially around the circumference of MFC 16. MFC 16 is configured to take radial measurements of a wellbore, e.g., of a pipe casing on a vertical scale, based on the radial translation of fingers 22 of MFC 16 as they scrape the pipe inner wall.

MFC 16 is configured to be run into the wellbore with fingers 22 in a collapsed or radially inward state. Once MFC 16 arrives at a target depth within the wellbore, fingers 22 can be actuated into an expanded state. Fingers 22 are spring loaded such that the tips of fingers 22 push against the inner diameter of the wellbore, e.g., the inner diameter of the pipe within the wellbore. As MFC 16 is logged up the wellbore, radial movement of fingers 22 in and out is transferred to a position sensor. The output of the position sensor can then be digitized, recorded, and/or transmitted by electronics of MFC 16 and/or tool string 10. MFC 16 can be configured to monitor data from each of fingers 22 independently.

MFC 16 can be used to determine a variety of information about the internal surface of a wellbore, including, e.g., a pipe casing within the wellbore. Pipe internal surface information generated by data measurements of MFC 16 can include, e.g., corrosion, wear, deformation, drill string damage, perforation mapping, well construction characteristics, scale build up, and hole or other anomaly locations.

MFC 16 can include a sensor section including a sensor head, finger section, and sensor electronics. The sensor section includes a number of fingers 22 configured to track the internal surface of a wellbore. Each of fingers 22 can be configured to move independently. Coupled to each of fingers 22 is an actuator, which forms one half of the sensor for that finger. Fingers 22 may be constructed from various materials, including various metals and metallic alloys. Additionally, the tips of fingers 22 can be hardened to reduce wear and maintain accuracy throughout a logging operation of a wellbore. Each of fingers 22 can be actuated by a spring or other biasing mechanism. The spring or other mechanism can be designed to provide an approximately constant force by the tip of the finger 22 throughout the radial range of the finger.

The sensor head includes sensor coils for fingers 22. The sensor coils for each of fingers 22 can be attached to a coil interface printed circuit board (PCB), which can be mounted on the sensor head. The coil interface PCB can be configured to apply drive signals to the sensor coils and select which of fingers 22 to be sampled. The sensor electronics can be attached adjacent the coil interface PCB, e.g., above the PCB along MFC 16. MFC 16 can employ a variety of different types of sensors coupled to fingers 22 to acquire and record radial measurements within a wellbore. MFC 16 can include Variable Differential Transformer (LVDT) sensors, which are configured to convert linear displacement provided by fingers 22 and the actuators connected thereto, into an electrical measurement of the position of each of fingers 22.

As with CAST 12 and CBL 14, MFC 16 can include one or more sections containing circuit boards and other circuitry necessary for powering electronics of MFC 16 and for acquiring, computing, and sending data uphole for further processing. The electronics section(s) of MFC 16 can include, in addition to the sensor electronics associated with fingers 22, one or more circuits and/or components for energy storage, surge protection, power supply, memory, communication, and data acquisition and processing. Additionally, electronics section(s) of MFC 16 can include motor control circuitry for operating a motor that is employed to expand and contract fingers 22 into and out of engagement with the inner wall of a wellbore. Examples of memory circuitry that can be included in the electronics section of MFC 16 includes any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Additionally, examples of data acquisition and processing circuitry that can be employed in MFC 16 includes any one or more of a microprocessor, a controller, a digital signal processor (DSP), an application specific integrated circuit (ASIC), a field-programmable gate array (FPGA), or equivalent discrete or integrated logic circuitry.

MFC 16 can be a 24, 40, or 60 finger Multifinger Imaging Tool (MIT) manufactured by General Electric Company of Fairfield, Conn. MFC 16 can also be another electro-mechanical multi-finger caliper that is configured to take radial measurements within a wellbore.

Although described above as included in each of CAST 12, CBL 14, and MFC 16 separately, in other examples, tool string 10 may include one or more electronics sections that contain circuit boards and other circuitry for operating all of the tools in the tool string.

Aligning the longitudinal axis of a logging tool string with the longitudinal axis of a wellbore can be important to proper operation of CAST, CBL, and MFC tools incorporated into the tool string. As such, tool string 10 also includes stabilizer 18, which is configured to center tool string 10 within a wellbore. Stabilizer 18 can include an array of stabilizer arms 24 distributed circumferentially around the circumference of tool string 10. Each stabilizer arm can be biased radially outward to engage and push against the inner wall of the pipe and thereby center the tool string within the wellbore such that the longitudinal axis of the tool string is substantially aligned with the longitudinal axis of the wellbore. In the example of FIG. 1, each of stabilizer arms 24 include two links, which are pivotally connected at one end to the body of tool 10 and to pivotally connected to one another at the other end. A leaf spring 26 biases the pivotal connection between each of the links of each arm 24 radially outward toward the inner wall of the wellbore.

Example tool string 10 is configured to combine acoustic wellbore inspection and evaluation tools, CAST 12 and CBL 14, with an electro-mechanic tool, MFC 16, to circumvent the limitations that both technologies may be subjected to in wellbore environments. Combining acoustic and electro-mechanical inspection and evaluation in tool string 10 can provide less ambiguous results as to the condition of the wellbore completion and cement behind the pipe casing. Anomalous data from one or both of CAST 12 and CBL 14 can be correlated with data acquired by MFC 16 to determine wellbore conditions that may have adversely affected the operation of CAST 12 and/or CBL 14.

For example, tool string 10 can be lowered into a wellbore including a pipe casing surrounded by cement surrounded by formation. Once tool string 10 arrives at a target depth of the wellbore, the string is logged back up the wellbore. As tool string 10 is logged up the wellbore, CAST 12, CBL 14, and MFC 16 take measurements of the wellbore based on acoustic and electro-mechanical signals generated by the respective tools. For example, the transducer of CAST 12 transmits and receives ultrasonic waves, the amplitude and travel time of which are employed to determine wellbore characteristics such as pipe thickness, pipe ID, and the acoustic impedance of the cement and/or formation surrounding the pipe. The transmitter of CBL 14 transmits sonic waves, which are received by near and far receivers arranged approximately three and five feet away from the transmitter. The signals received at near receiver of CBL 14 can be used to provide data signals about the integrity of the cement bond to the well pipe, while the signals received at the far receiver can be used to provide data signals about the formation surrounding the wellbore, which may include information about the cement bond with the formation.

In addition to the wellbore characteristics determined based on the acoustic signals transmitted and received by CAST 12 and CBL 14, MFC 16 electro-mechanically measures variations in the inner surface of the pipe of the wellbore based on radial translations of fingers 22. Pipe internal surface information generated by data measurements of MFC 16 can include, e.g., corrosion, wear, deformation, drill string damage, perforation mapping, well construction characteristics, scale build up, and hole or other anomaly locations along the wellbore.

As CAST 12, CBL 14, and MFC 16 generate data about characteristics of the wellbore, electronics of each of these tools or of tool string 10 can be configured to store, process, and/or transmit the data to generate a wellbore log. Data generated downhole by one or more of CAST 12, CBL 14, and MFC 16 can be transmitted in real or near real-time to a surface system for storage and processing. In another example, data generated downhole by one or more of CAST 12, CBL 14, and MFC 16 is stored and preprocessed by electronics of tool string 10 prior to being transmitted to a surface system for further processing and/or inspection by an operator. In any event, the wellbore log generated based on the data provided by CAST 12, CBL 14, and MFC 16 can be used to generate a report that can be displayed and reviewed by operators of the well. An example report and the manner in which an operator can use such information are described in more detail with reference to FIG. 3.

As described above, the conditions of the wellbore within which tool string 10 is operated may adversely affect the operation of the acoustic inspection tools CAST 12 and/or CBL 14. CAST 12 of tool string 10 can be configured to employ a BSI to identify conditions of the wellbore that may have led to anomalous data generated by CAST 12.

Figure 2:
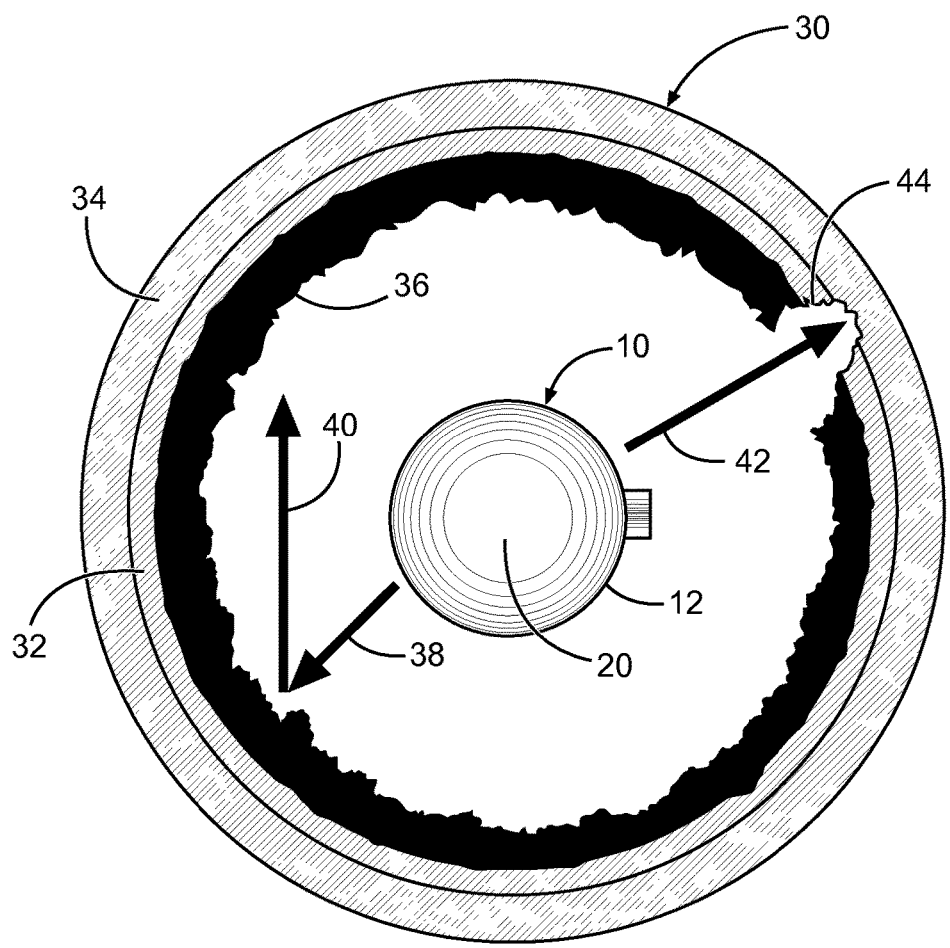
FIG. 2 is a cross-section of a wellbore 30 in which the example wellbore logging tool string of FIG. 1 is suspended.

FIG. 2 is a cross-section of wellbore 30 in which tool string 10 including CAST 12 is suspended. For clarity and simplicity, only the end of tool string 10 including rotating transducer head 20 of CAST 12 is shown in FIG. 2. FIG. 2 illustrates a number of conditions of wellbore 30 that can lead to anomalous data from CAST 12 or another such acoustic inspection tool.

In FIG. 2, wellbore 30 includes pipe casing 32, at least partially surrounded by cement layer 34. FIG. 2 also illustrates scale deposit 36 built up on the inner surface of pipe 32. Although not shown in FIG. 2, wellbore 30 also includes formation surrounding cement layer 34.

As described above, there are a variety of conditions of wellbore 30 that can adversely effect the operation of acoustic based tools like CAST 12. FIG. 2 illustrates two situations in which measurements taken by CAST 12 are negatively impacted by conditions of wellbore 30, indicated generally at 30, which penetrates a formation 34. For purposes of the present description, two different types of example anomalies will be discussed in reference to FIG. 2. In most cases, these anomalies would be found at separate depths within the wellbore, and will be discussed as if they were at different depths, though depicted here in a single cross-section.

The transducer housed in rotating head 20 of CAST 12 can transmit an ultrasonic signal 38 radially outward toward the inner wall of casing 32. Ultrasonic signal 38 strikes scale deposit 36, however, causing reflected signal 40 to be improperly reflected toward another portion of the inner surface of casing 32 instead of back to the transducer of CAST 12. In another example illustrated in FIG. 2, the transducer housed in rotating head 20 of CAST 12 transmits an ultrasonic signal 42 radially outward toward the inner wall of casing 32. In this example, however, perforation 44 in casing 32 prevents signal 42 from being reflected at all.

In some cases, one or both of the adverse signal events illustrated in FIG. 2 can be characterized as so-called "bad shots," though due to different effects. As such, CAST 12 can be configured to associate data samples generated based on acoustic signals 38, 40, and 42 with a value on a bad shot index, BSI. In other words, at the depth at which scaling deposit 36 caused improper reflection of signal 38 and the depth at which perforation 44 caused no reflection of signal 42, CAST 12 is configured to log the data about wellbore 30 generated based on signals 38, 40, and 42, as well as an indication of the BSI indices associated with each event.

As tool string 10 is logged up wellbore 30, in addition to CAST 12 generating data based on acoustic signals, MFC 16 also generates data to characterize the conditions of wellbore 30 based on electro-mechanical signals. As such, at the depth at which scaling deposit 36 caused improper reflection of signal 38 and the depth at which perforation 44 caused no reflection of signal 42, the same features of wellbore 30 can also be detected by MFC 16 as radial variations detected by radial translation of fingers 22 of MFC 16. For example, scaling deposit 36 may cause an abrupt and/or large decrease in one or more radial measurements registered by one or more of fingers 22 of MFC 16. Similarly, perforation 44 should cause an abrupt and/or large increase in one or more radial measurements registered by one or more of fingers 22 of MFC 16.

In operation, tool string 10 can be configured to depth and time-stamp each data sample acquired by each of CAST 12, CBL 14, and MFC 16. In order to have a comparison between caliper measurements of MFC 16 and CAST 12 "bad shots", the data samples from CAST 12 and MFC 16 can be aligned based on the depth and time-stamping. Once the data samples for all of the tools and the BSI associated with anomalous results from CAST 12 and/or CBL 14 are aligned, all of the data can be used to generate a report that longitudinally tracks various characteristics of wellbore 30.

Figure 3:
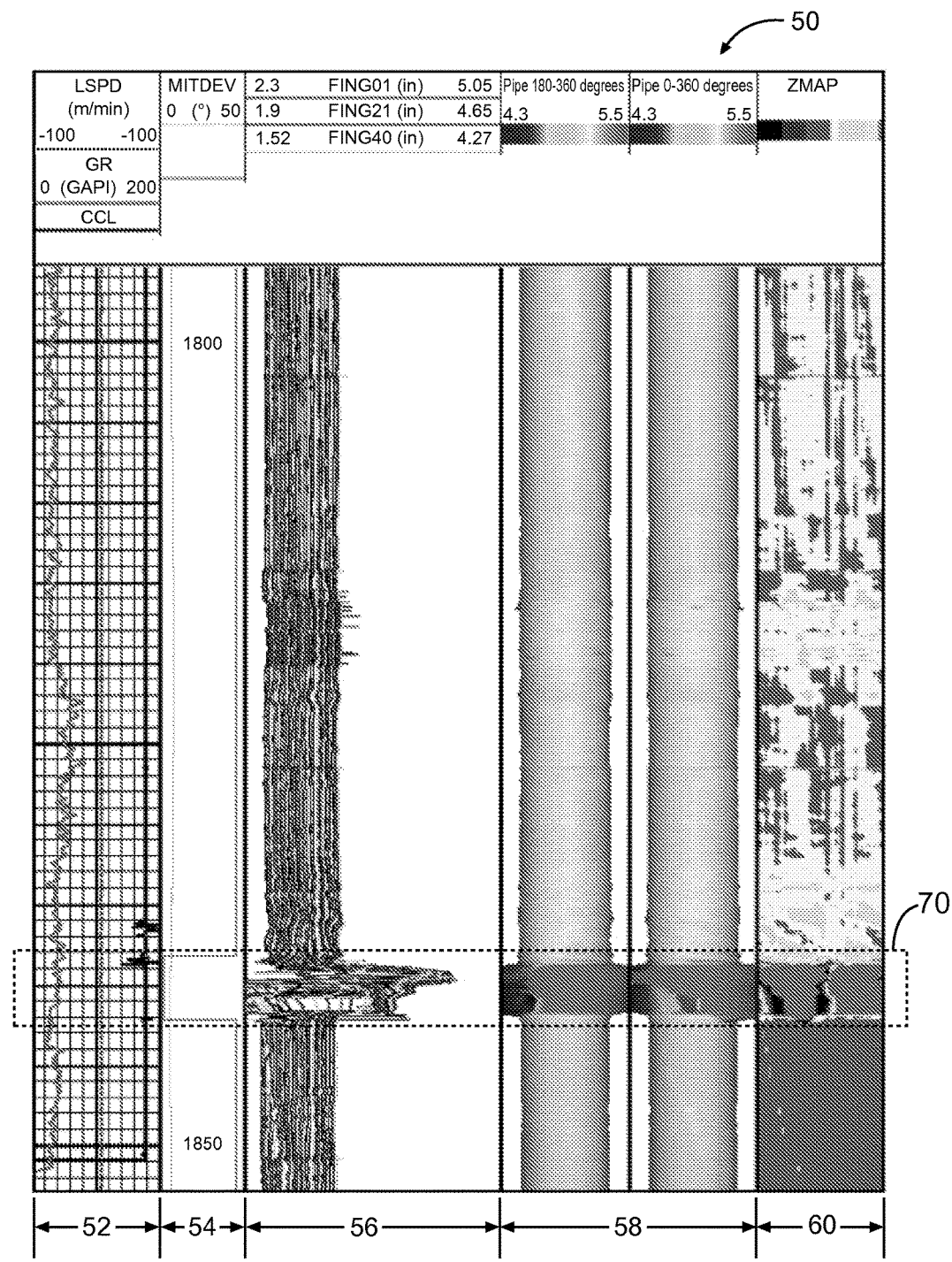
FIG. 3 illustrates an example report generated based on data samples received from one or more acoustic inspection tools and an electro-mechanical tool included in a wellbore logging tool string in accordance with this disclosure.

FIG. 3 illustrates an example report 50 generated based on data samples from one or more acoustic inspection tools and an electro-mechanical MFC tool, as well as from a BSI associated with bad shots of one or both of the acoustic tools. Report 50 can be generated in whole or in part by electronics of tool string 10 and/or by electronics of a surface level computing system with which tool string 10 is configured to communicate data from CAST 12, CBL 14, and MFC 16. Unprocessed or partially processed data from CAST 12, CBL 14, and MFC 16 can be transmitted by electronics of tool string 10 to a surface computing system. In some cases, tool string 10 is physically suspended within wellbore 30 by one or more electrically conducting cables. The cables by which tool string 10 is suspended in wellbore 30 can also function to communicate data back and forth from downhole tool string 10 and the surface computing system. The surface computing system can include storage devices, communication devices, processors, and input/output devices necessary to send, receive, store, process, and output data related to wellbore 30. The surface computing system can include an output device, including, e.g., a display device for outputting reports characterizing wellbore conditions, which can be inspected and reviewed by operators at the surface of the well.

In the example of FIG. 3, vertical section 52 illustrates wellbore characteristics generated based on data samples received from CBL 14; this example, including curves commonly associated with casing inspections operations, such as line speed (LSPD), a gamma ray log measurement (GR) and a casing collar locator (CCL).

Vertical section 54 illustrates a BSI index values associated with data samples received from CAST 12. Variations in this index from a flat line at BSI index 0 indicate locations of bad shots of CAST 12. The magnitude of the variation indicates the value of the BSI index associated with each bad shot of CAST 12. In other examples, different traces could be used for one or more different types of indices indicating data that fails to meet one or more criteria; such criteria, in many examples, established relative to parameters indicative of whether the generated data is likely to be reliable or not.

Each of the plotted curves illustrated in vertical section 56 of report 50 is generated based on data samples received from different fingers 22 of MFC 16. The variation in the plotted curves in vertical section 56 represent radial translations of fingers 22 of MFC 16 caused by changed in the inner wall of casing 32 of wellbore 30.

Vertical section 58 illustrates the shape and size of casing 32 (e.g., pipe thickness and/or pipe ID) generated based on data samples received from CAST 12 for the full 360 degrees around the inner circumference of the pipe. Vertical section 60 of report 50 illustrates the acoustic impedance of cement 34 and/or formation surrounding casing 32 in wellbore 30. The impedance map illustrated in section 60 is also generated based on data samples received from CAST 12.

After or as tool string 10 is logged up wellbore 30, data transmitted from CAST 12, CBL 14, and MFC 16 can be processed by the surface computing system to generate example report 50 or other similar reports characterizing the conditions of wellbore 30. The surface computing system can be configured to output portions or all of report 50 for inspection and evaluation by an operator at the surface of the well. For example, the surface computing system can electronically output report 50 to a display device, such as a CRT or LCD display. In another example, the surface computing system can output a hardcopy of report 50.

Regardless of how report 50 is output for inspection, different information in the report can be correlated to disambiguate conditions of certain sections of wellbore 30. For example, upon inspection of report 50, an operator may determine that CAST 12 provided inaccurate or otherwise anomalous data for the well size/shape casing 32 in vertical section 58 and impedance of cement 34 in vertical section 60 at a depth of wellbore indicated by boxed horizontal section 70 in FIG. 3. As indicated in FIG. 3, at this same depth of wellbore 30 indicated by section 70, the value of the BSI index illustrated in vertical section 54 jumps from 0 to 4, which may indicate that the anomalous data samples from CAST 12 are associated with impedance values of cement 34 that are outside of prescribed window of values. At this same depth of wellbore 30, a number of the curves for different fingers 22 of MFC 16 also spike to greater radial measurements of the inner wall of casing 32.

The variations in the radial measurements based on data samples from fingers 22 of MFC 16 indicate that the radial size of casing 32 at this depth increases substantially. In this case, the operator may infer from the anomalous readings of CAST 12 in vertical sections 58 and 60, the BSI value in vertical section 54, and the increased casing 32 radii measurements of MFC 16 in vertical section 56 that casing 32 has a perforation, deformation, or some other damage that is causing the anomalous results from CAST 12. In this manner, the operator can cross-reference "bad shots" generated from CAST 12 with individual radii measurements provided by MFC 16 to recognize if there are any and, in some cases, what particular pipe anomalies within the logged interval have affected proper data acquisition by CAST 12.

One way in which data transmitted from CAST 12, CBL 14, and MFC 16 can be used in combination is to determine if anomalous CAST and/or CBL data indicates a break or other defect in the cement surrounding the wellbore pipe, or, instead, if casing 32 has a perforation, deformation, or some other damage that is causing anomalous results from CAST 12 or CBL 14. Cross-referencing BSI and caliper measurements can be used to validate the presence of cement behind the wellbore pipe and, in this manner, can act as an additional quality control criterion between CAST and MFC data acquisition. By comparing BSI and MFC data sets with acoustic impedance measurements (acquired by CAST 12), well operators can discern if any internal wall damage is present in a particular pipe interval and how this information is correlated with the lack of cement (per low acoustic impedance) and high number of bad shots, in the same depth interval.

A casing section with high caliper variation (i.e. corroded or damaged pipe) and high number of bad shots that also shows low acoustic impedance values (e.g., <1 MRayl) may in fact be indicating a sector where acoustic pulse echoes did not propagate past the pipe wall thickness to determine true identification of the cement surrounding the pipe. Without the correlation between BSI and MFC data sets, the CAST data may otherwise be interpreted as indicating a defect in the cement. With the BSI, MFC, and CAST data sets, however, an operator may infer that the anomalous CAST data indicates irregularities in within the pipe, instead of problems with cement surrounding the pipe.

At a first depth interval, acoustic impedance data from tool string 10 may indicate a lack of cement in the wellbore. CBL data may, however, show excellent bond in the same interval. For example, data from CBL 14 may include a wave amplitude value less than 10 mV and a 5-foot MSG showing weak casing arrivals and strong formation arrivals. These results, along with an increase in BSI in the same interval may indicate that the low impedance measurement is more than likely due to non-uniform pipe inner wall affecting CAST cement evaluation. In this manner, devices and methods in accordance with this disclosure may provide greater understanding that an indication of a lack of cement from an acoustic inspection tool at a particular depth interval may in fact be the result of the pipe medium negatively influencing CAST measurements.

Such results are also illustrated by a second example, in which increased BSI values coincide with areas of low acoustic impedance and data from MFC 16 indicating considerable changes in pipe diameter from nominal values. As explained above, information acquired by CBL 14 may not coincide with data acquired by CAST 12. For example, the 3-foot amplitude curves may be so low, that neither appears on the report. In addition, the 5-foot MSG image track may show highly attenuated casing arrivals and some formation arrivals, indicating that the cement bond is actually excellent in this interval.

Devices and methods in accordance with this disclosure can provide comparative logging results for both cement evaluation and pipe inspection from independent tools. In addition, the use of CAST LQC curves and number of bad shot information helps in determining when pipe conditions are affecting tool response, which, in turn can reduce log uncertainty and help operators determine appropriate remedial actions.

In some of the foregoing examples, correlation between data generated by one or more acoustic inspection tools and data generated by an electro-mechanical tool is described as carried out by an operator, e.g., by reviewing a report. However, in other examples, the data from the acoustic and electro-mechanical tools could be automatically analyzed by a computing device that is configured to detect anomalous data samples from an acoustic tool, associate such anomalies with a BSI or other similar log quality curve (LQC), and correlate particular BSI index values with data samples received from an electro-mechanical tool. The computing device could also be configured to, based on such correlation, determine a possible cause of the anomalous data samples generated by the acoustic tool(s).

Figure 4:
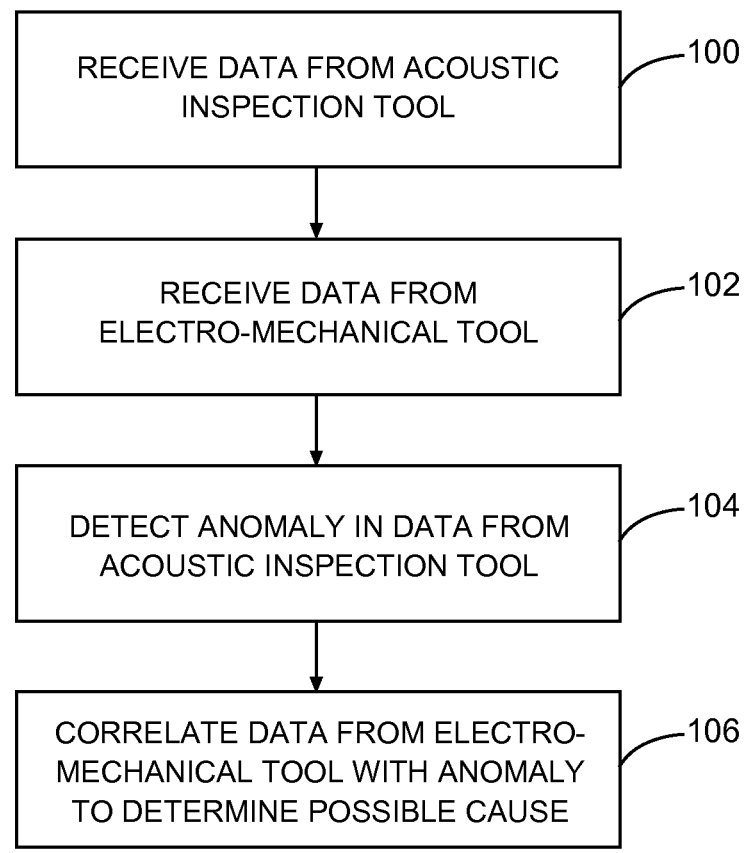
FIG. 4 is a flowchart illustrating an example method of characterizing wellbore conditions using a multi-tool wellbore logging tool string in accordance with this disclosure.

FIG. 4 is a flowchart illustrating an example method of characterizing wellbore conditions using a multi-tool wellbore logging tool string. The method described below may be performed by one or more processing units. As is well known in the art, a processing unit may be provided at the Earth's surface, and the logging tool may be placed in communication with that processing unit. In many example systems, the processing unit 120 (which may be a conventional "computer" (in any of a variety of known forms)) will provides a suitable user interface and can provide and control storage, processing, and/or transmission of data. In many examples, the processing unit will include one or more processors in combination with additional hardware as needed (volatile and/or non-volatile memory (of any suitable form, DRAM, FLASH, SRAM, etc.) or another storage device; communication ports (I/O device(s) and ports; etc.) to provide the functionality as described herein.

In examples such as that described herein, wherein a tool string may be conveyed in the well through use of a wireline, then such communication may be established through electrical or optical conductors located in the wireline. In some example systems, some or all of the processing may be performed by a processing unit associated with the tool string downhole. In that circumstance, the data can be retained by a suitable storage mechanisms associated with the tool string for retrieval when the tool string is returned to the surface. Accordingly, it should be clearly understood that the example functionalities described herein can be performed entirely by a surface-located processing unit, entirely by a downhole-located processing unit, or by some combination of the two.

The method of FIG. 4 includes receiving, by a computing device, data indicative of at least one wellbore characteristic from an acoustic inspection tool of the multi-tool wellbore logging tool string (100), receiving, by the computing device, data indicative of at least one wellbore characteristic from an electro-mechanical tool of the multi-tool wellbore logging tool string (102), detecting, by the computing device, an anomaly in the data received from the acoustic inspection tool (104), and correlating a portion of the data received from the electro-mechanical tool with the detected anomaly in the data received from the acoustic inspection tool to determine a possible cause of the anomaly (106).

Various examples have been described. These and other examples are within the scope of the following claims.

The invention claimed is:

1. A wellbore logging system comprising:
   a wellbore tool string to be positioned in a wellbore, the wellbore tool string comprising:
      an acoustic inspection tool configured to generate data indicative of downhole conditions;
      an ultrasonic imaging tool configured to image downhole structures; and
      an electro-mechanical inspection tool configured to generate data indicative of wellbore conditions based on electro-mechanical signals generated by the electro-mechanical inspection tool within the wellbore; and
   a computing device comprising:
      at least one processor, and
      at least one machine readable storage device including instructions stored thereon that when executed by the at least one processor, results in performance of operations comprising:
         detecting an anomaly in the data received from at least one of the acoustic inspection tool and the ultrasonic imaging tool; and correlating a portion of the data received from the electro-mechanical inspection tool with the detected anomaly in the data received from the at least one of the acoustic inspection tool and the ultrasonic imaging tool to determine a possible cause of the anomaly.

2. The wellbore logging system of claim 1, wherein the operations further comprise:
receiving the data from the acoustic inspection tool, data from the ultrasonic imaging tool, and the data from the electro-mechanical inspection tool; and
generating a correlation of the data from the acoustic inspection tool, the ultrasonic imaging tool, and the electro-mechanical inspection tool.

3. The wellbore logging system of claim 1, wherein the operations further comprise determining a value of a bad shot index associated with an anomaly in the data received from the acoustic inspection tool.

4. The wellbore logging system of claim 2, wherein generating the correlation of the data comprises generating a report that visually depicts the data received from the acoustic inspection tool, the ultrasonic imaging tool, and the electro-mechanical inspection tool.

5. The wellbore logging system according to claim 1, wherein the acoustic inspection tool comprises a cement bond log tool.

6. The wellbore logging system according to claim 1, wherein the electro-mechanical inspection tool comprises a multi-finger caliper.

7. The wellbore logging system according to claim 1, wherein the ultrasonic imaging tool comprises a circumferential acoustic scanning tool.

8. A method of characterizing wellbore conditions using a wellbore tool string, the method comprising:
receiving, by a computing device, data indicative of at least one wellbore characteristic from an acoustic inspection tool of the wellbore tool string;
receiving, by the computing device, data indicative of at least one wellbore characteristic from an electro-mechanical inspection tool of the wellbore tool string;
detecting, by the computing device, an anomaly in the data received from the acoustic inspection tool; and
correlating, by the computing device, a portion of the data received from the electro-mechanical inspection tool with the detected anomaly in the data received from the acoustic inspection tool to determine a possible cause of the anomaly.

9. The method of claim 8, further comprising:
receiving, by the computing device, data indicative of at least one wellbore characteristic from an ultrasonic imaging tool of the wellbore tool string, and
wherein detecting comprises detecting, by the computing device, the anomaly in the data received from at least one of the acoustic inspection tool and the ultrasonic imaging tool, and
wherein correlating comprises correlating a portion of the data received from the electro-mechanical tool with the detected anomaly in the data received from the at least one of the acoustic inspection tool and the ultrasonic imaging tool to determine a possible cause of the anomaly.

10. The method of claim 9, further comprising determining a value of a bad shot index associated with an anomaly in the data received from the acoustic inspection tool.

11. The method of claim 9, wherein correlating comprises generating a report that visually depicts the data received from the acoustic inspection tool, the ultrasonic imaging tool, and the electro-mechanical inspection tool.

12. The method according to claim 9, wherein the ultrasonic imaging tool comprises a circumferential acoustic scanning tool.

13. The method according to claim 9, further comprising:
transmitting a first acoustic signal from the acoustic inspection tool into a formation;
receiving, by the acoustic inspection tool, a second acoustic signal from the formation;
outputting, by the acoustic inspection tool, the data indicative of the at least one wellbore characteristic based on the second acoustic signal;
transmitting a third acoustic signal from the ultrasonic imaging tool into the formation;
receiving, by the ultrasonic imaging tool, a fourth acoustic signal from the formation;
outputting, by the acoustic inspection tool, the data indicative of the at least one wellbore characteristic based on the fourth acoustic signal;
engaging a portion of the wellbore with a mechanism of the electro-mechanical inspection tool; generating, the electro-mechanical inspection tool, by an electrical signal based on the engagement of the wellbore with the mechanism; and
outputting, by the electro-mechanical inspection tool, the data indicative of the at least one wellbore characteristic based on the electrical signal.

14. The method according to claim 8, wherein the acoustic inspection tool comprises a cement bond log tool.

15. The method according to claim 8, wherein the electro-mechanical inspection tool comprises a multi-finger caliper.

16. A non-transitory computer-readable storage medium that includes instructions that, if executed by a computing device having one or more processors, result in performance of operations comprising:
receiving data indicative of at least one wellbore characteristic from an acoustic inspection tool included in a wellbore tool string;
receiving data indicative of at least one wellbore characteristic from an electro-mechanical inspection tool of the wellbore tool string;
detecting an anomaly in the data received from the acoustic inspection tool; and
correlating a portion of the data received from the electro-mechanical inspection tool with the detected anomaly in the data received from the acoustic inspection tool to determine a possible cause of the anomaly.

17. The non-transitory computer-readable storage medium of claim 16, wherein the instructions, if executed by the computing device, result in the performance of operations comprising:
receiving, by the computing device, data indicative of at least one wellbore characteristic from an ultrasonic imaging tool of the wellbore tool string, and
wherein detecting comprises detecting, by the computing device, the anomaly in the data received from at least one of the acoustic inspection tool and the ultrasonic imaging tool, and
wherein correlating comprises correlating a portion of the data received from the electro-mechanical inspection tool with the detected anomaly in the data received from the at least one of the acoustic inspection tool and the ultrasonic imaging tool to determine a possible cause of the anomaly.

18. The non-transitory computer-readable storage medium of claim 16, wherein the instructions, if executed by the computing device, result in the performance of operations comprising determining a value of a bad shot index associated with an anomaly in the data received from the acoustic inspection tool.

19. The non-transitory computer-readable storage medium of claim 16, wherein correlating comprises generating a report that visually depicts the data received from the acoustic inspection tool, the ultrasonic imaging tool, and the electro-mechanical inspection tool.

20. A wellbore logging system comprising:
a wellbore tool string comprising:
at least one acoustic inspection tool configured to generate data indicative of wellbore conditions based on signals generated by the acoustic inspection tool within a wellbore; and
an electro-mechanical inspection tool configured to generate data indicative of wellbore conditions based on signals generated by the electro-mechanical inspection tool within the wellbore; and
a computing device, comprising:
at least one processor, and
at least one machine readable storage device including instructions stored thereon that when executed by the at least one processor, results in performance of operations comprising:
receiving the data from the at least one acoustic inspection tool and the data from the electro-mechanical inspection tool; and
detecting an anomaly in the data received from the at least one acoustic inspection tool; and
correlating a portion of the data received from the electro-mechanical inspection tool with the detected anomaly in the data received from the at least one acoustic inspection tool to determine a possible cause of the anomaly.

21. The wellbore logging system of claim 20, wherein the instructions that when executed by the at least one processor, results in the performance of operations comprising:
generating a wellbore log including the data from the acoustic inspection tool and the data from the electro-mechanical inspection tool.

22. The wellbore logging system of claim 21, wherein the wellbore log comprises a report that visually represents the data from the at least one acoustic inspection tool and the data from the electro-mechanical inspection tool such that variations in the data from the at least one acoustic inspection tool are visually correlated to variations in the data from the electro-mechanical inspection tool.

23. The wellbore logging system of claim 20, wherein the instructions that when executed by the at least one processor, results in the performance of operations comprising: determining a value of a bad shot index associated with the anomaly in the data received from the acoustic inspection tool.

24. The wellbore logging system of claim 23, wherein the instructions what when executed by the at least one processor, results in the performance of operations comprising:
correlating the value of the bad shot index for the anomaly with a portion of the data received from the electro-mechanical inspection tool to determine the possible cause of the anomaly.

25. The wellbore logging system according to claim 20, wherein the at least one acoustic inspection tool comprises at least one of a circumferential acoustic scanning tool and a cement bond log tool.

26. The wellbore logging system according to claim 20, wherein the electro-mechanical inspection tool comprises a multi-finger caliper.

* * * * *